United States Patent
Ogihara et al.

(10) Patent No.: US 10,946,794 B2
(45) Date of Patent: Mar. 16, 2021

(54) WORK MACHINE MANAGEMENT SYSTEM, WORK MACHINE CONTROL SYSTEM, AND WORK MACHINE

(71) Applicant: Komatsu Ltd., Tokyo (JP)

(72) Inventors: Masanori Ogihara, Tokyo (JP); Koji Takeda, Tokyo (JP); Tomonori Ozaki, Tokyo (JP); Akiharu Nishijima, Tokyo (JP); Ryuuen Kou, Tokyo (JP)

(73) Assignee: KOMATSU LTD., Tokyo (JP)

( * ) Notice: Subject to any disclaimer, the term of this patent is extended or adjusted under 35 U.S.C. 154(b) by 342 days.

(21) Appl. No.: 15/779,998

(22) PCT Filed: Nov. 15, 2016

(86) PCT No.: PCT/JP2016/083755
§ 371 (c)(1),
(2) Date: May 30, 2018

(87) PCT Pub. No.: WO2017/104329
PCT Pub. Date: Jun. 22, 2017

(65) Prior Publication Data
US 2018/0354412 A1 Dec. 13, 2018

(30) Foreign Application Priority Data

Dec. 18, 2015 (JP) .............................. JP2015-247731

(51) Int. Cl.
*B60Q 1/34* (2006.01)
*E02F 9/20* (2006.01)
(Continued)

(52) U.S. Cl.
CPC ................ *B60Q 1/346* (2013.01); *E02F 9/20* (2013.01); *E02F 9/26* (2013.01); *G01C 21/20* (2013.01); *G01C 21/26* (2013.01); *E02F 9/205* (2013.01)

(58) Field of Classification Search
CPC ................ B60Q 1/346; B60Q 2400/00; B60Q 2900/30; B60Q 1/0035; B60Q 1/28;
(Continued)

(56) References Cited

U.S. PATENT DOCUMENTS 6,246,932 B1    6/2001  Kageyama et al.
9,663,033 B2 *  5/2017  Bharwani .............. B60Q 9/008
(Continued)

FOREIGN PATENT DOCUMENTS

| JP | 05-324058 A | 12/1993 |
| JP | 2010-202021 A | 9/2010 |
| WO | 1998/037468 A1 | 8/1998 |

OTHER PUBLICATIONS

Tawari et al., Looking-in and Looking-out Vision for Urban Intelligent Assistance: Estimation of Driver Attentive State and Dynamic Surround for Safe Merging and Braking, 2014, IEEE, p. 115-120 (Year: 2014).*

(Continued)

*Primary Examiner* — McDieunel Marc
(74) *Attorney, Agent, or Firm* — Lock Lord LLP

(57) ABSTRACT

A work machine management system includes: an operation range setting unit that sets an operation range in which a direction indicator of a work machine is operated; a traveling condition data generation unit that generates traveling condition data of the work machine; a blinker data setting unit that generates blinker data for controlling the direction indicator on the basis of the operation range and the traveling condition data; and an output device that outputs the blinker data to the work machine.

10 Claims, 14 Drawing Sheets

(51) Int. Cl.
*G01C 21/26* (2006.01)
*E02F 9/26* (2006.01)
*G01C 21/20* (2006.01)

(58) Field of Classification Search
CPC ...... B60Q 1/30; B60Q 1/46; G05D 2201/021;
G05D 1/021; G05D 1/0278; B60P 1/04;
B60P 3/00; B60Y 2200/92; G06F 17/00;
G08B 29/185; G07C 5/085; E02F 9/205;
E02F 9/20; B60K 35/00; G01F 9/00;
G01C 21/20
See application file for complete search history.

(56) References Cited

U.S. PATENT DOCUMENTS

| | | | | |
|---|---|---|---|---|
| 9,842,501 | B2* | 12/2017 | Osagawa | G08B 29/185 |
| 9,958,284 | B2* | 5/2018 | Fino | G08G 1/0129 |
| 10,343,595 | B2* | 7/2019 | Ogihara | B60Q 1/346 |
| 10,394,250 | B2* | 8/2019 | Kadono | G05D 1/0276 |
| 10,549,681 | B2* | 2/2020 | Ogihara | B60P 3/00 |
| 2009/0063031 | A1* | 3/2009 | Greiner | G06Q 10/08 701/117 |
| 2014/0058635 | A1* | 2/2014 | Furukawa | B60R 16/02 701/50 |
| 2016/0185346 | A1* | 6/2016 | Awamori | B60W 10/20 701/23 |
| 2017/0151946 | A1* | 6/2017 | Shiga | B60W 40/076 |
| 2017/0153649 | A1* | 6/2017 | Ogihara | B60T 7/16 |
| 2017/0192434 | A1* | 7/2017 | Kou | G08G 1/096775 |
| 2019/0241119 | A1* | 8/2019 | Takeda | B60Q 1/30 |

OTHER PUBLICATIONS

International Search Report dated Feb. 7, 2017, issued for PCT/JP2016/083755.

* cited by examiner

WORK MACHINE MANAGEMENT SYSTEM, WORK MACHINE CONTROL SYSTEM, AND WORK MACHINE

FIELD

The present invention relates to a work machine management system, a work machine control system, and a work machine.

BACKGROUND

Unmanned work machines traveling in a mine and manned vehicles may both operate in the same mine. The safety in a mine will be improved if a driver driving a manned vehicle can know the traveling direction of an unmanned mining machine at an intersection, for example. Patent Literature 1 discloses a technology of a direction indicating system in an autonomous unmanned carrier vehicle.

CITATION LIST

Patent Literature

Patent Literature 1: Japanese Laid-open Patent Publication No. 05-324058 A

SUMMARY

Technical Problem

Use of a direction indicator is considered to contribute to improvement in the safety in a mine. No technologies of using the direction indicator for unmanned work machines, however, have been established.

Aspects of the present invention are aimed at providing a work machine management system, a work machine control system, and a work machine capable of improving safety in a mine.

Solution to Problem

A first aspect of the present invention provides a work machine management system comprising: an operation range setting unit that sets an operation range in which a direction indicator of a work machine is operated; a traveling condition data generation unit that generates traveling condition data of the work machine; a blinker data setting unit that generates blinker data for controlling the direction indicator on the basis of the operation range and the traveling condition data; and an output device that outputs the blinker data to the work machine.

A second aspect of the present invention provides a work machine management system comprising: an operation range setting unit that sets an operation range in which a direction indicator of a work machine is operated; a blinker data setting unit that generates blinker data for controlling the direction indicator; an absolute position data acquisition unit that acquires absolute position data of the work machine; a determination unit that determines whether or not the work machine is present in the operation range on the basis of the absolute position data; and an output device that outputs the blinker data to the work machine determined to be present in the operation range.

A third aspect of the present invention provides a work machine control system comprising: a blinker data acquisition unit that acquires blinker data for controlling a direction indicator of a work machine; an absolute position data acquisition unit that acquires absolute position data of the work machine; and a blinker control unit that outputs a blinker control signal to the direction indicator on the basis of the blinker data and the absolute position data.

A fourth aspect of the present invention provides a work machine comprising the work machine control system according to the third aspect.

A fifth aspect of the present invention provides a work machine management method including: setting an operation range in which a direction indicator of a work machine is operated; generating traveling condition data of the work machine; generating blinker data for controlling the direction indicator on the basis of the operation range and the traveling condition data; and outputting the blinker data to the work machine.

Advantageous Effects of Invention

According to the aspect of the present invention, a work machine management system, a work machine control system, and a work machine capable of improving safety in a mine are provided.

DESCRIPTION OF EMBODIMENTS

An embodiment according to the present invention is hereinafter described with reference to the drawings; however, the present invention is not limited to this.

First Embodiment

Figure 1:
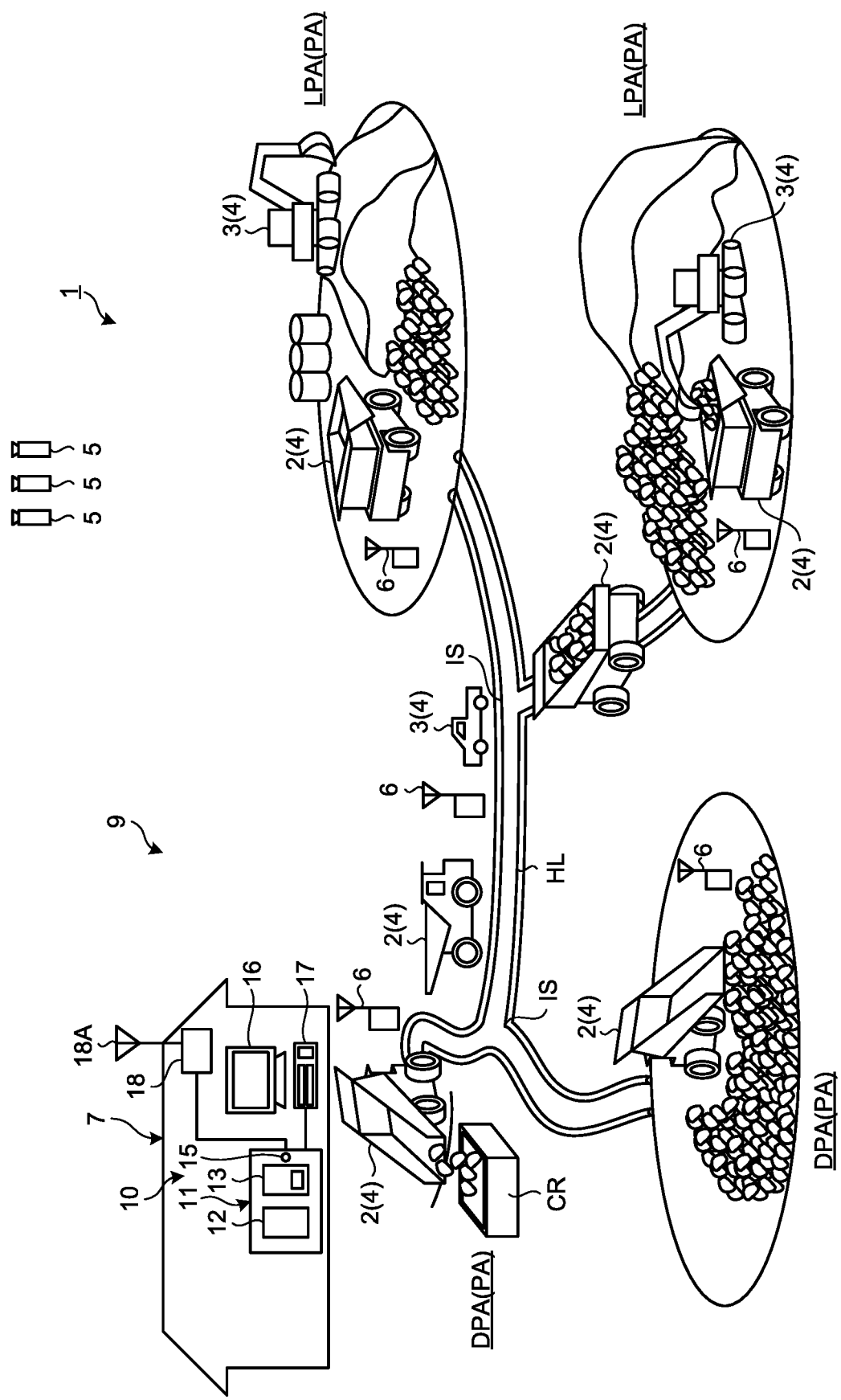
FIG. 1 is a diagram schematically illustrating an example of a work machine management system according to a first embodiment.

A first embodiment will be described. FIG. 1 is a diagram illustrating an example of a management system 1 for managing work machines 4 according to the present embodiment. In the present embodiment, an example in which the work machines 4 are mining machines 4 that operate in a mine will be described. The management system 1 manages the mining machines 4. The management of the mining machines 4 includes at least one of management of operations of the mining machines 4, evaluation of the productivity of the mining machines 4, evaluation of the operation skills of operators of the mining machines 4, maintenance of the mining machines 4, and abnormality diagnosis of the mining machines 4.

The mining machines 4 refer generally to machines used for various operations in a mine. The mining machines 4 include at least one of boring machines, excavation machines, loaders, transporting machines, crushing machines, and vehicles driven by drivers. An excavation machine is a mining machine for digging in a mine. A loader is a mining machine for loading a transporting machine. Loaders include at least one of hydraulic excavators, electric excavators, and wheel loaders. A transporting machine is a mining machine for carrying a load. A crushing machine is a mining machine for crushing discharged soil fed by a transporting machine. The mining machines 4 are movable in a mine.

In the present embodiment, the mining machines 4 include dump trucks 2, which are transporting machines capable of traveling in a mine, and other mining machines 3 other than the dump trucks 2. In the present embodiment, an example in which dump trucks 2 are mainly managed by the management system 1 will be described.

As illustrated in FIG. 1, the dump trucks 2 travel at least part of transportation roads HL leading to working sites PA in a mine. The working sites PA include at least one of a loading site LPA and a soil discharging site DPA. The transportation roads HL include intersections IS. The dump truck 2 travels along a target travel path set on the transportation roads HL and the working sites PA.

The loading site LPA is an area in which loading operation of loading the dump truck 2 is carried out. The soil discharging site DPA is an area in which unloading operation of unloading the dump truck 2 is carried out. In the example illustrated in FIG. 1, the crushing machines CR are located in at least some of the soil discharging sites DPA.

The present embodiment will be described on the assumption that the dump trucks 2 are unmanned dump trucks that autonomously travel in a mine in accordance with instruction signals from a management device 10. Autonomous traveling of the dump truck 2 refers to traveling in accordance with instruction signals from the management device 10 without operation performed a driver.

In FIG. 1, the management system 1 includes the management device 10 located in a control facility 7 set up in the mine, and a communication system 9. The communication system 9 includes a plurality of relays 6 that relay data and instruction signals. The communication system 9 performs radio communication of data and instruction signals between the management device 10 and the mining machines 4. The communication system 9 also performs radio communication of data and instruction signals between the mining machines 4.

In the present embodiment, the positions of the dump trucks 2 and the positions of the other mining machines 3 are detected with use of a global navigation satellite system (GNSS). The GNSS stands for a global navigation satellite system. An example of the global navigation satellite system is a GPS. The GNSS includes a plurality of positioning satellites 5. The GNSS detects a position defined by coordinate data of longitude, latitude, and altitude. A position detected by the GNSS is an absolute position defined in a global coordinate system. The GNSS detects the positions of the dump trucks 2 and the positions of the other mining machines 3 in the mine.

In the description below, a position detected by the GNSS will be referred to as a GPS position where appropriate. The GPS position is an absolute position containing coordinate data of longitude, latitude, and altitude. The absolute position includes an estimated position of the dump truck 2, which is obtained by highly accurate estimation.

Next, the management device 10 will be described. The management device 10 transmits data or instruction signals to the mining machines 4, and receives data from the mining machines 4. As illustrated in FIG. 1, the management device 10 includes a computer 11, a display device 16, an input device 17, and a radio communication device 18.

The computer 11 includes a processor 12, a memory 13, and an input/output unit 15. The display device 16, the input device 17, and the radio communication device 18 are connected with the computer 11 via the input/output unit 15.

The processor 12 performs arithmetic processing for managing the mining machines 4. The memory 13 is connected with the processor 12, and stores data for management of the mining machines 4. The input device 17 is a device for inputting data for management of the mining machines 4 to the processor 12, and is constituted by a keyboard, a mouse, or the like for a computer, for example. The processor 12 performs arithmetic processing by using data stored in the memory 13, data input from the input device 17, and data acquired via the communication system 9. The display device 16 displays results of arithmetic processing from the processor 12, and the like.

The radio communication device 18 is located in the control facility 7, has an antenna 18A, an is connected with the processor 12 via the input/output unit 15. The communication system 9 includes the radio communication device 18. The radio communication device 18 is capable of receiving data transmitted from the mining machines 4, and the received data is output to the processor 12 and stored into the memory 13. The radio communication device 18 is capable of transmitting data to the mining machines 4.

Figure 2:
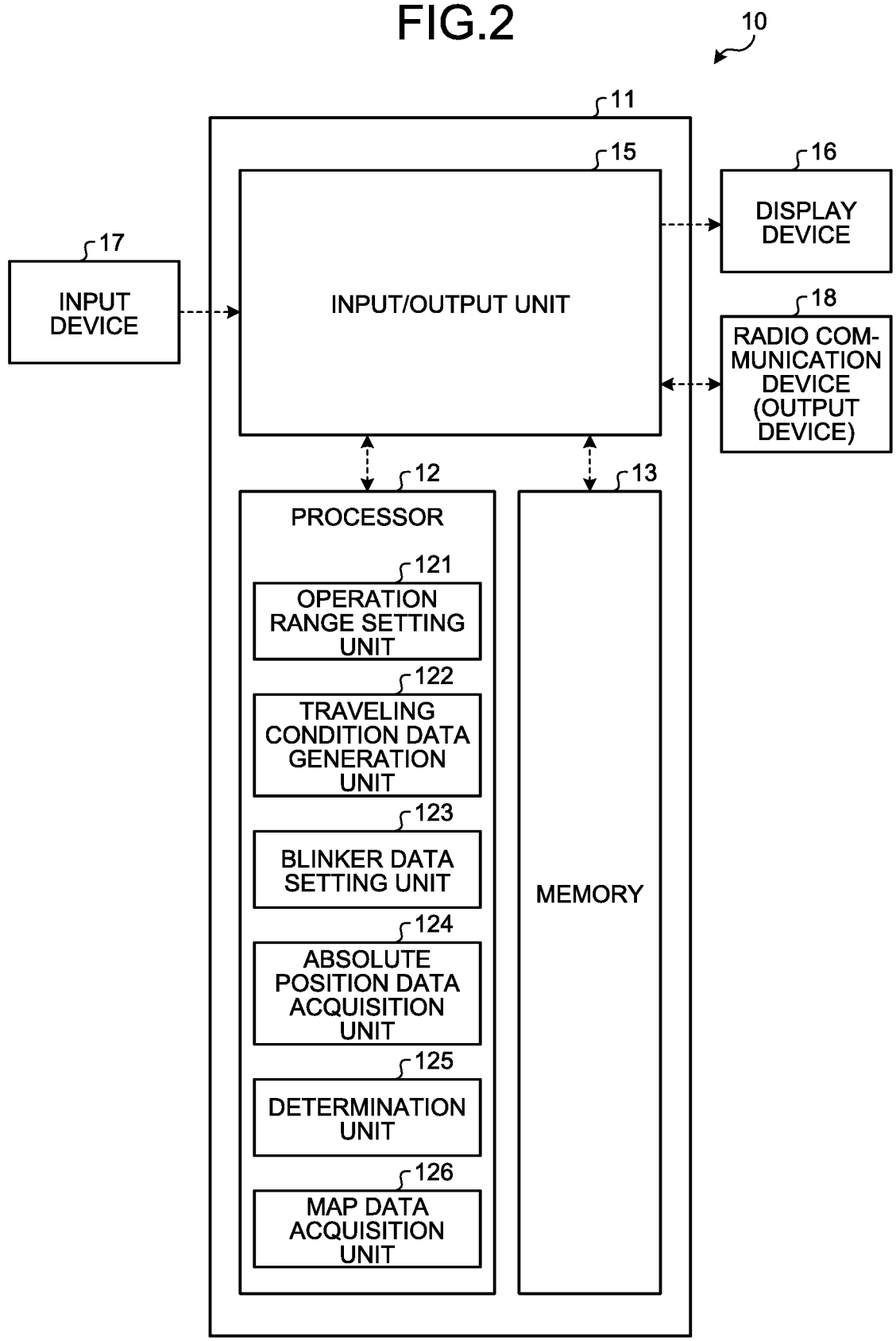
FIG. 2 is a functional block diagram illustrating an example of the work machine management system according to the first embodiment.

FIG. 2 is a functional block diagram illustrating an example of the management device 10 according to the present embodiment. As illustrated in FIG. 2, the processor 12 of the management device 10 includes an operation range setting unit 121 that sets an operation range AR in which direction indicator 37 of the dump trucks 2 are caused to operate in the mine, a traveling condition data generation unit 122 that generates traveling condition data for the dump trucks 2, and a blinker data setting unit 123 that generates blinker data for controlling the direction indicators 37 on the basis of the operation range AR and the traveling condition data. Blinker data is output to the dump trucks 2 via the radio communication device 18 that functions as an output device.

The processor 12 also includes an absolute position data acquisition unit 124 that acquires absolute position data of the dump trucks 2, and a determination unit 125 that determines whether or not the dump truck 2 is present in the operation range AR on the basis of the absolute position data.

The processor 12 also includes a map data acquisition unit 126 that acquires map data of the mine. Map data is outer edge lines of areas in which the mining machines 4 can be placed in the mine, for example, which is constituted by combination of left and right end lines of the transportation roads HL and perimeter lines of the working sites PA in the mine illustrated in FIG. 1. The map data is collected by an operator by traveling in the mine in a manned vehicle with a GNSS, for example. The map data collected by the operator is input by the input device 17 and acquired by the map data acquisition unit 126. The acquired map data is stored into the memory 13.

The operation range AR is set by an operator (manager) by operating the input device 17. When the input device 17 is operated by the operator, the input device 17 generates operation range data indicating an operation range AR. The operation range setting unit 121 sets the operation range AR on the basis of the operation range data generated by the input device 17.

The operator sets the operation range AR by referring to the map data of the mine. The operator sets the operation range AR by specifying an area in the mine in which the direction indicators 37 of the dump truck 2 should operate on the basis of the map data of the mine. The operation range setting unit 121 sets the operation range AR to an area specified in the mine on the basis of the map data.

Figure 3:
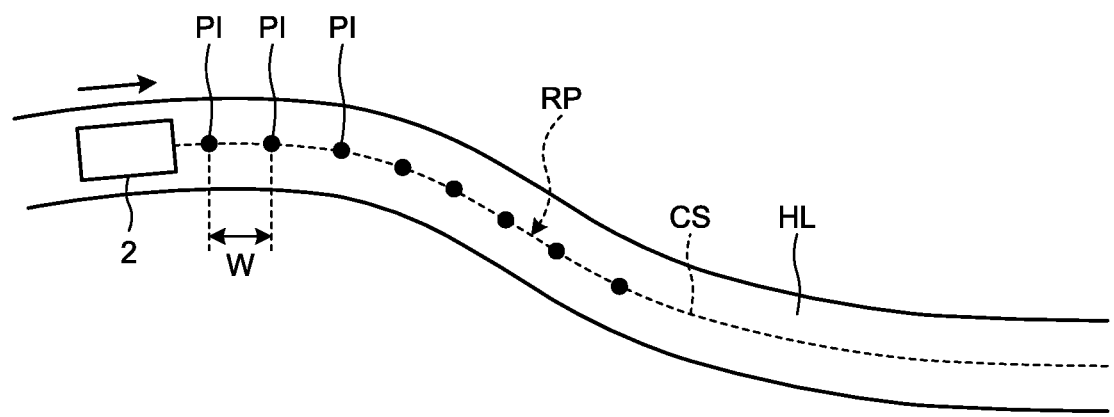
FIG. 3 is a schematic diagram for explaining a target travel path of a dump truck according to the first embodiment.

FIG. 3 is a schematic diagram illustrating the dump truck 2 traveling on the transportation road HL. The traveling condition data generation unit 122 of the processor 12 generates traveling condition data of the dump truck 2 traveling in the mine. The traveling condition data includes a set of a plurality of course points PI set at regular intervals W.

Each of the course points PI includes target absolute position data of the dump truck 2 and target traveling speed data of the dump truck 2 at the position where the course point PI is set. A target travel path RP is defined by course data CS, which are a set of course points PI. The target travel path RP of the dump truck 2 is defined by a trajectory passing through a plurality of course points PI. The target traveling speed of the dump truck 2 at a position where the course point PI is set is defined on the basis of the target traveling speed data.

In addition, each of the course points PI includes blinker data for the dump truck 2 to control the direction indicators 37. The blinker data is data relating to how the dump truck 2 should control the direction indicators 37 when passing through the position of the course point PI. In the present embodiment, the blinker data include data for turning on a right blinker, data for turning on a left blinker, data for turning on hazard lights, and data for turning off a blinker, for example.

In the present embodiment, the blinker data setting unit 123 sets the blinker data for the course points PI set in the operation range AR. Thus, in the present embodiment, each of the course points PI includes absolute position data, target traveling speed data, and blinker data.

The management device 10 outputs the traveling condition data including course points PI ahead in the traveling direction to the dump truck 2 via the radio communication device 18. The dump truck 2 travels in the mine in accordance with the traveling condition data transmitted from the management device 10. In addition, the dump truck 2 controls the direction indicators 37 in accordance with the blinker data transmitted from the management device 10.

Figure 4:
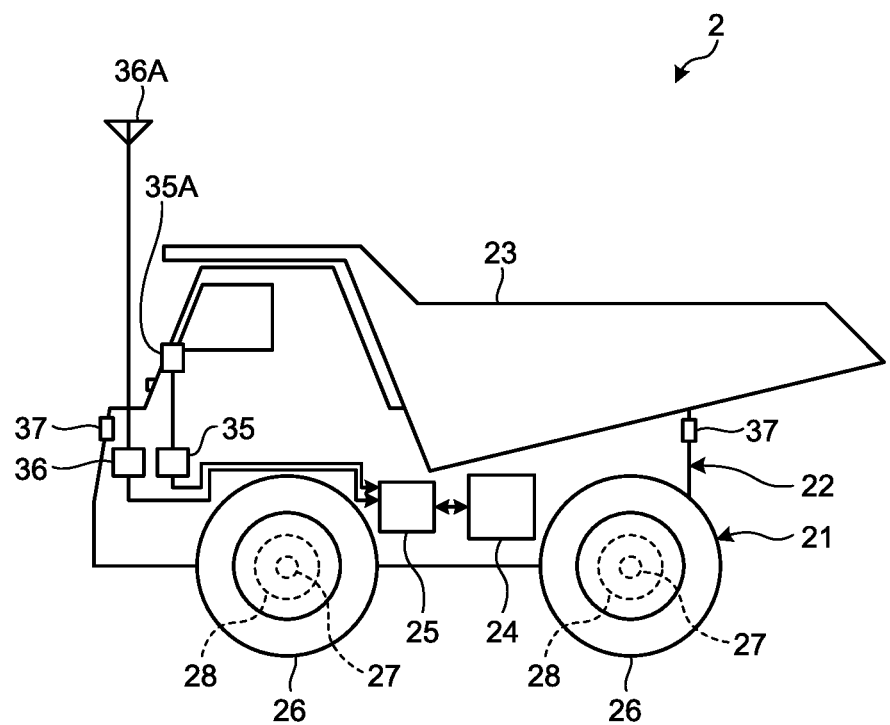
FIG. 4 is a diagram schematically illustrating an example of the dump truck according to the first embodiment.
Figure 5:
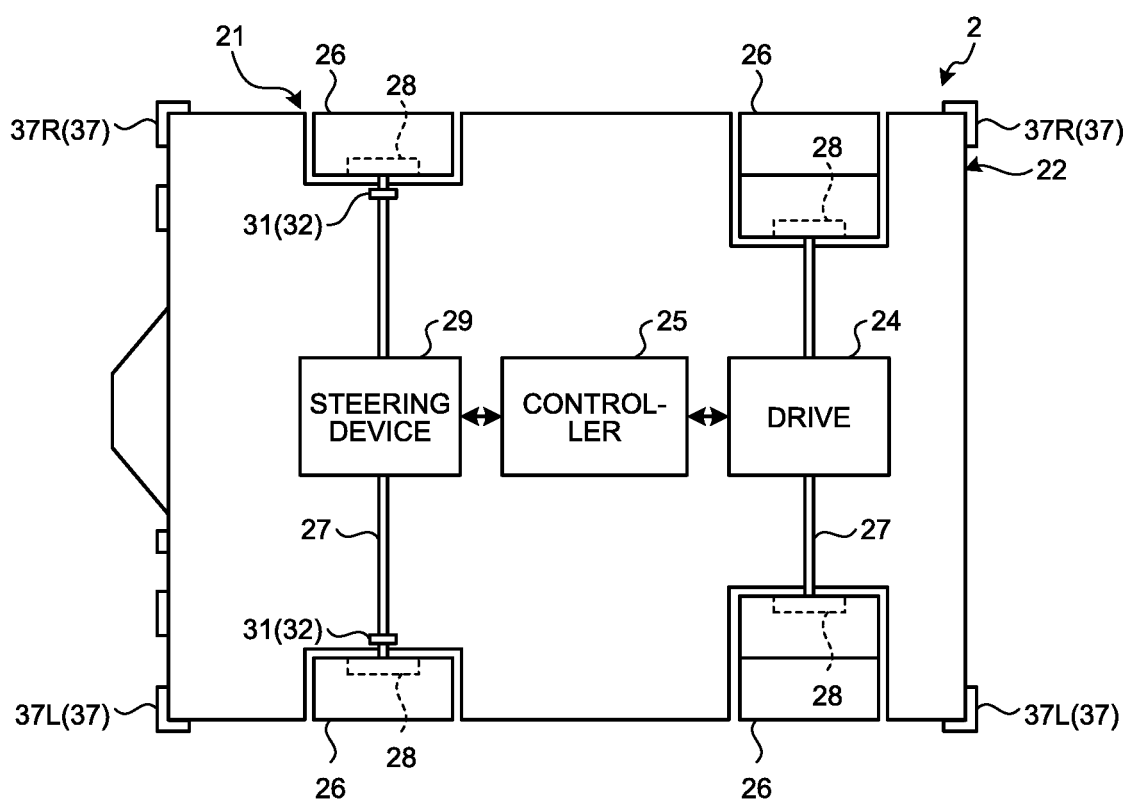
FIG. 5 is a diagram schematically illustrating an example of the dump truck according to the first embodiment.

Next, the dump truck 2 will be described. FIGS. 4 and 5 are diagrams schematically illustrating an example of the dump truck 2.

The dump truck 2 includes a traveling device 21 capable of traveling in a mine, a vehicle body 22 supported by the traveling device 21, a vessel 23 supported by the vehicle body 22, a drive 24 that drives the traveling device 21, the direction indicators 37, and a controller 25.

The traveling device 21 includes wheels 26, axles 27 rotatably supporting the wheels 26, a brake system 28 that brakes the traveling device 21, and a steering device 29 capable of adjusting the traveling direction.

The traveling device 21 is actuate by driving force generated by the drive 24. The drive 24 generates driving force for accelerating the dump truck 2. The drive 24 drives the traveling device 21 by an electric drive system. The drive 24 includes an internal combustion engine such as a diesel engine, a generator actuated by power from the internal combustion engine, and an electric motor actuated by power generated by the generator. The driving force generated by the electric motor is transmitted to the wheels 26 of the traveling device 21. The traveling device 21 is driven in this manner. The dump truck 2 travels autonomously by the driving force from the drive 24 installed in the vehicle body 22. The output of the drive 24 is adjusted such that the traveling speed of the dump truck 2 is adjusted. Note that the drive 24 may drive the traveling device 21 by a mechanical drive system. For example, the power generated by the internal combustion engine may be transmitted to the wheels 26 of the traveling device 21.

The steering device 29 is capable of adjusting the traveling direction of the traveling device 21. The traveling direction of the dump truck 2 including the traveling device 21 includes the orientation of a front part of the vehicle body 22. The steering device 29 adjusts the traveling direction of the dump truck 2 by changing the orientations of the wheels 26.

The brake system 28 generates braking force for decelerating or stopping the dump truck 2. The controller 25 outputs an accelerator instruction signal for operating the drive 24, a brake instruction signal for operating the brake system 28, and a steering instruction signal for operating the steering device 29. The drive 24 generates the driving force for accelerating the dump truck 2 on the basis of the accelerator instruction signal output from the controller 25. The brake system 28 generates the braking force for decelerating the dump truck 2 on the basis of the brake instruction signal output from the controller 35. The steering device 29 generates force for changing the orientations of the wheels 26 to make the dump truck 2 go straight or turn on the basis of the steering instruction signal output from the controller 25.

The direction indicator 37 indicates the traveling direction of the dump truck 2. The direction indicators 37 are located on each of the front part and a rear part of the vehicle body 22. The direction indicators 37 include blinker lamps, which are turned on (blink) to inform those around of the traveling direction of the dump truck 2. The direction indicators 37 include blinker lamps 37R, which are turned on when the dump truck 2 turns right, and blinker lamps 37L, which are turned on when the dump truck 2 turns left. The blinker lamps 37R are located on a right part of the vehicle body 22, and the blinker lamps 37L are located on a left part of the vehicle body 22.

In the description below, lighting of the blinker lamps 37R will be referred to as right-turn light-on, where appropriate, and lighting of the blinker lamps 37L will be referred to as left-turn light-on, where appropriate.

The dump truck 2 also includes a traveling speed detector 31 that detects the traveling speed of the dump truck 2, an acceleration detector 32 that detects the acceleration of the dump truck 2, a position detector 35 that detects the position of the dump truck 2, and a radio communication device 36.

The traveling speed detector 31 detects the traveling speed of the dump truck 2. The traveling speed detector 31 includes a rotational speed sensor that detects the rotational speed of the wheels 26. Since the rotational speed of the wheels 26 and the traveling speed of the dump truck 2 are correlated, a rotational speed value, which is a detected value of the rotational speed sensor, is converted into a traveling speed value of the dump truck 2. Alternatively, the traveling speed detector 31 may detect the rotational speed of the wheels 26.

The acceleration detector 32 detects the acceleration of the dump truck 2. The acceleration of the dump truck 2 includes positive acceleration and negative acceleration (deceleration). In the present embodiment, arithmetic processing is performed on the basis of the rotational speed value, which is a detected value of the rotational speed sensor that detects the rotational speed of the wheels 26, for conversion into an acceleration value of the dump truck 2. Note that the traveling speed detector 31 and the acceleration detector 32 may be separate detectors.

The position detector 35 includes a GPS receiver, and detects a GPS position (coordinates) of the dump truck 2. The position detector 35 includes an antenna 35A for the GPS. The antenna 35A receives radio waves from the positioning satellites 5. The position detector 35 converts signals based on the radio waves from the positioning satellites 5 received by the antenna 35A into electrical signals to calculate the position of the antenna 35A. The GPS position of the dump truck 2 is detected by calculation of the GPS position of the antenna 35A.

The communication system 9 includes the radio communication device 36 mounted on the dump truck 2. The radio communication device 36 includes an antenna 36A. The radio communication device 36 is capable of performing radio communication with the management device 10.

The management device 10 transmits an instruction signal containing the traveling condition data of the dump truck 2 to the controller 25 via the communication system 9. The controller 25 controls at least one of the drive 24, the brake system 28, and the steering device 29 of the dump truck 2 on the basis of the traveling condition data supplied from the management device 10 so that the dump truck 2 travels according to the traveling condition data (including absolute position data, target traveling speeds, and target azimuths at a plurality of points PI).

In addition, the dump truck 2 transmits absolute position data indicating the absolute position of the dump truck 2 detected by the position detector 35 to the management device 10 via the communication system 9. The absolute position data acquisition unit 124 of the management device 10 acquires the absolute position data of a plurality of the dump trucks 2 traveling in the mine. The absolute position data acquisition unit 124 of the management device 10 also acquires absolute position data of the other mining machines 3 each of which includes a position detector 35 in addition to those of the dump trucks 2.

Figure 6:
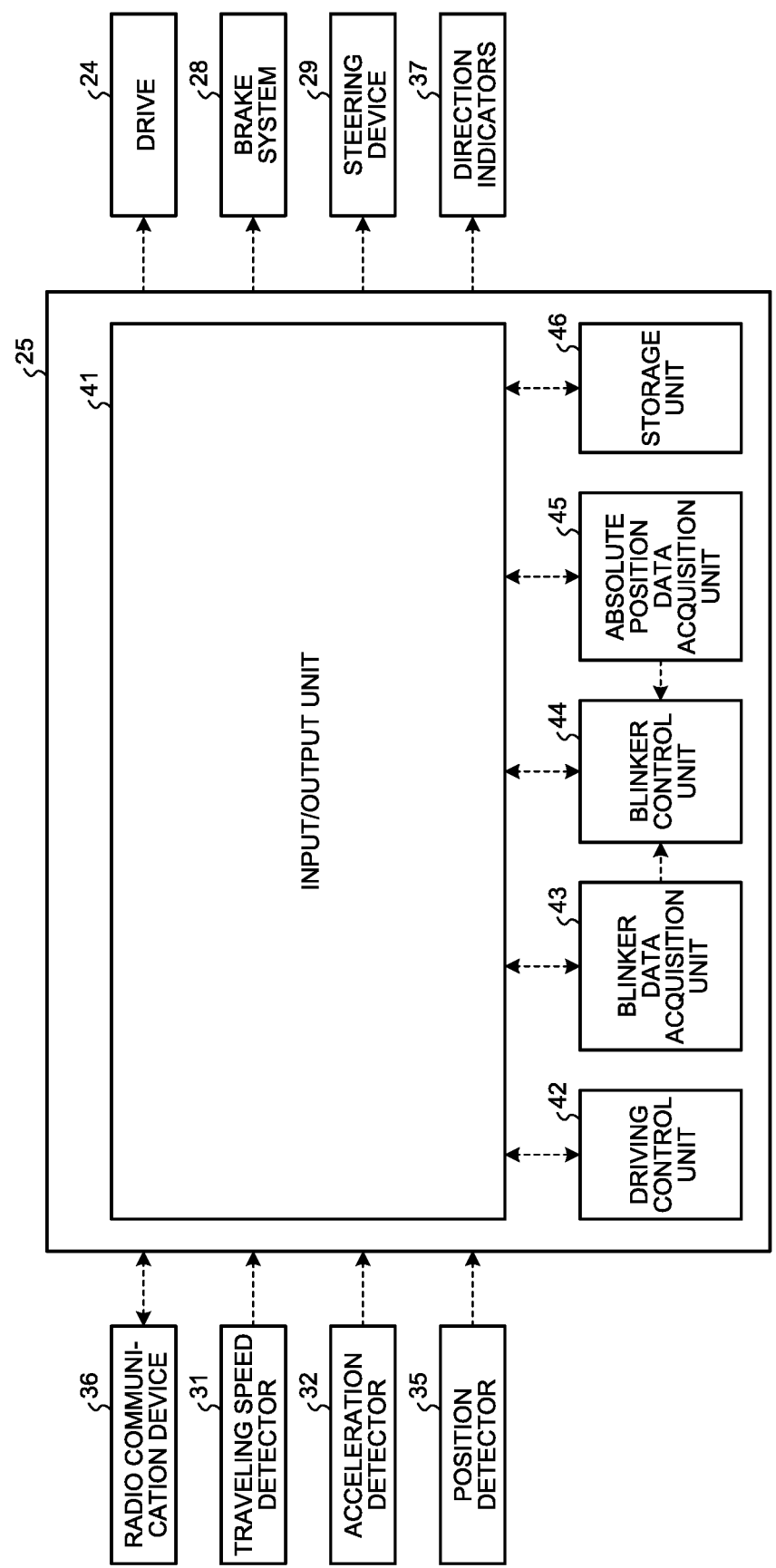
FIG. 6 is a functional block diagram illustrating an example of a control system of a dump truck according to the first embodiment.

Next, a control system 20 of the dump truck 2 according to the present embodiment will be described. FIG. 6 is a control block diagram illustrating the control system 20 according to the present embodiment. The control system 20 is mounted on the dump truck 2.

As illustrated in FIG. 6, the control system 20 includes the radio communication device 36, the traveling speed detector 31, the acceleration detector 32, the position detector 35, the controller 25, the drive 24, the brake system 28, the steering device 29, and the direction indicators 37.

The controller 25 includes an input/output unit 41, a driving control unit 42, a blinker data acquisition unit 43, a blinker control unit 44, an absolute position data acquisition unit 45, and a storage unit 46.

The input/output unit 41 acquires instruction data including blinker data and traveling condition data from the management device 10 output from the radio communication device 36, traveling speed data indicating the traveling speed of the dump truck 2 output from the traveling speed detector 31, acceleration data indicating the acceleration of the dump truck 2 output from the acceleration detector 32, and position data indicating the position of the dump truck 2 output from the position detector 35. The input/output unit 41 also outputs an accelerator instruction signal to the drive 24, a brake instruction signal to the brake system 28, and a steering instruction signal to the steering device 29.

The driving control unit 42 outputs a driving control signal for controlling the traveling device 21 of the dump truck 2 on the basis of specified traveling condition data. The traveling device 21 includes the brake system 28 and the steering device 29. The driving control unit 42 outputs a driving control signal to the traveling device 21 including the drive 24, the brake system 28, and the steering device 29. The driving control signal includes an accelerator signal output to the drive 24, a brake instruction signal output to the brake system 28, and a steering instruction signal output to the steering device 29.

The blinker data acquisition unit 43 acquires blinker data for controlling the direction indicators 37 of the dump truck 2. In the present embodiment, the blinker data acquisition unit 43 acquires the blinker data from the blinker data contained in the traveling condition data output from the management device 10.

The blinker control unit 44 outputs a blinker control signal to the direction indicators 37 on the dump truck 2 on the basis of the blinker data acquired by the blinker data acquisition unit 43. The blinker control signal includes a light-on signal for turning on the direction indicators 37 and a light-off signal for turning off the direction indicators 37. The light-on signal includes a right-turn light-on signal, a left-turn light-on signal, and a hazard light-on signal for performing right-turn light-on and left-turn light-on at the same time.

The absolute position data acquisition unit 45 acquires the absolute position data of the dump truck 2 from a result of detection of the position detector 35.

The storage unit 46 stores data relating to the traveling condition of the dump truck 2 acquired from the radio communication device 36. The traveling condition data includes data relating to control of the direction indicators 37, which will be described later.

Figure 7:
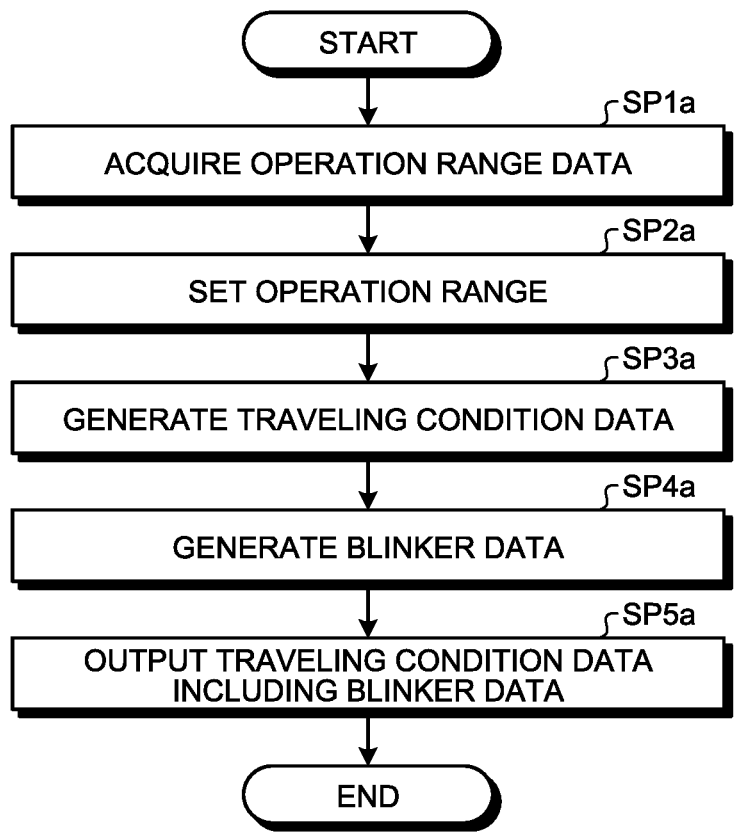
FIG. 7 is a flowchart illustrating an example of operation of the management system according to the first embodiment.

Next, a method for managing the dump truck 2 according to the present embodiment will be described. FIG. 7 is a flowchart illustrating an example of operation of the management system 1 according to the present embodiment.

Figure 8:
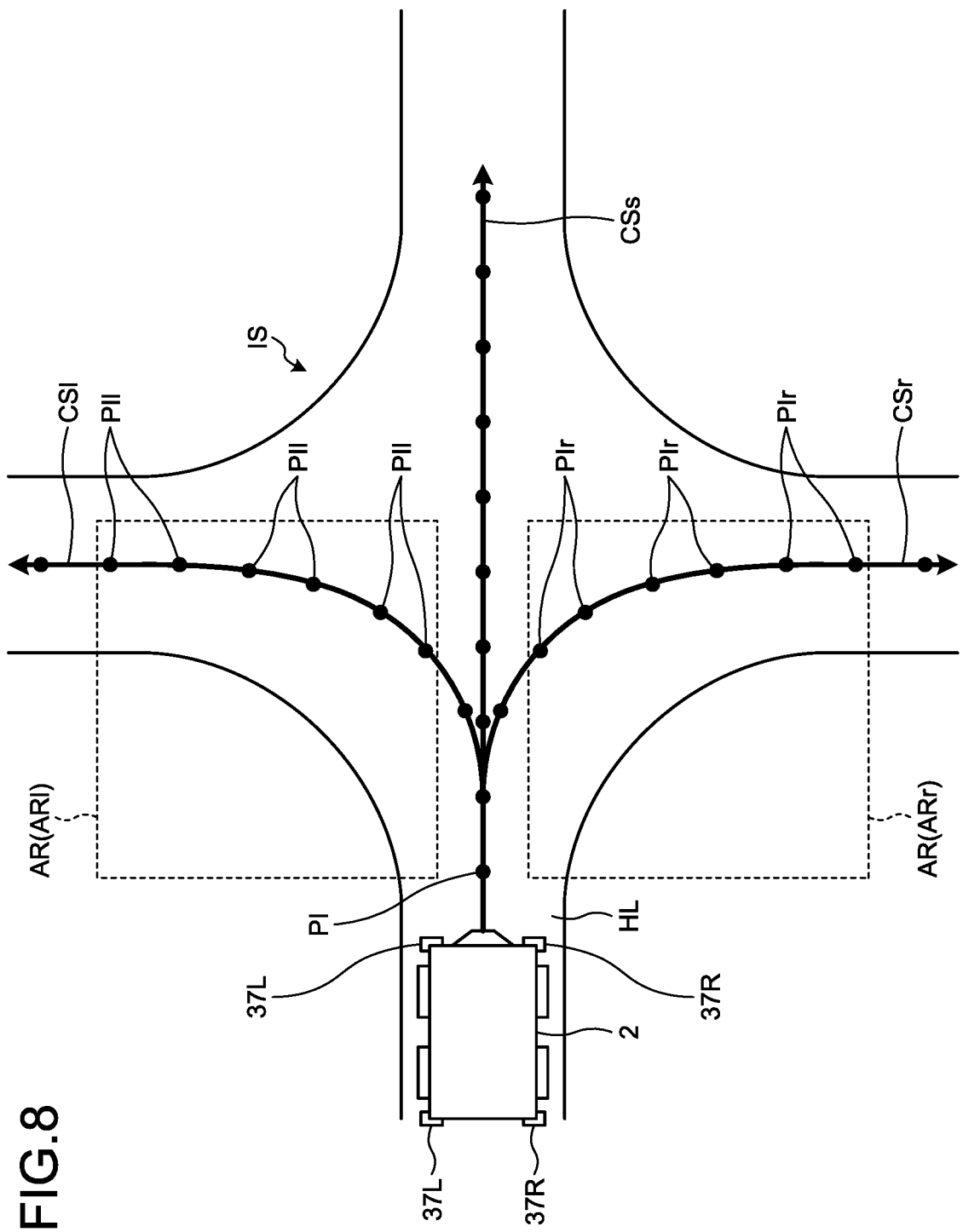
FIG. 8 is a diagram for explaining control on traveling and control on a direction indicator of a dump truck according to the first embodiment.

FIG. 8 is a schematic diagram for explaining control on the traveling and control on the direction indicators of the dump truck 2.

In the control facility 7, the input device 17 is operated by the operator (manager) to set the operation range AR in which the direction indicators 37 of the dump trucks 2 are to be operated in the mine. The operation range data is generated by the operation of the input device 17. The operation range setting unit 121 acquires the operation range data generated by the input device 17 (step SP1a).

The operation range setting unit 121 sets the operation range AR on the basis of the operation range data generated by the input device 17 (step SP2a).

FIG. 8 illustrates a state in which the operation range AR is set at the intersection IS. The operator specifies an area in the mine in which the direction indicators 37 should operate by referring to the map data of the mine displayed on the display device 16, and sets the operation range AR by using the input device 17. The operation range setting unit 121 sets the operation range AR to the intersection IS, which is the area specified in the mine, on the basis of the map data of the mine.

The traveling condition data generation unit 122 generates the traveling condition data of the dump trucks 2 (step SP3a). The traveling condition data generation unit 122 sets the plurality of the course points PI each including the target absolute position data and the target traveling speed data.

The blinker data setting unit 123 generates the blinker data for controlling the direction indicators 37 on the basis of the operation range AR set in step SP2a and the traveling condition data generated in step SP3a (step SP4a).

In the present embodiment, the blinker data setting unit 123 superimposes the blinker data on the course points PI set in the operation range AR.

As illustrated in FIG. 8, in a case where traveling condition data to make the dump truck 2 turn left at the intersection IS is generated, for example, the dump truck 2 travels in accordance with course data CS1. The course data CS1 is a set of course points PI. In the present embodiment, the blinker data setting unit 123 assigns the blinker data to the course points PI1 present in an operation range AR1 set to a left-turn range of the intersection IS from among the course points PI of the course data CS1. The blinker data assigned to the course points PI1 is blinker data of left-turn light-on.

The management device 10 outputs the traveling condition data containing the course points PI1 to which the blinker data is assigned to the dump truck 2 via the radio communication device 18 (step SP5a).

The dump truck 2 travels in accordance with the target absolute position data, the target traveling speed data, and the blinker data included in each of the course points PI when turning left at the intersection IS. When the dump truck 2 traveling on the transportation road HL enters the intersection IS and turns left at the intersection IS, the direction indicators 37 are turned on for left turning. As illustrated in FIG. 8, since the blinker data is not assigned to the course points PI set before the operation range AR1, the direction indicators 37 are not turned on before the operation range AR1. When the dump truck 2 enters the operation range AR1 and travels according to the course points PI1 to which the blinker data is assigned, the blinker lamps 37L are turned on for left turning. In addition, when the dump truck 2 exits the operation range AR1 and travels according to course points PI to which the blinker data is not assigned, the blinker lamps 37L are turned off.

The operation of the direction indicators 37 when the dump truck 2 turns left has been described above. For example, in a case where the traveling condition data to make the dump truck 2 turn right at the intersection IS is generated, the dump truck 2 travels in accordance with the course data CSr as illustrated in FIG. 8. The blinker data setting unit 123 assigns the blinker data, more specifically blinker data for right-turn light-on, to the course points PIr present in the operation range ARr set to a right-turn range of the intersection IS from among the course points PI of the course data CSr.

When the dump truck 2 traveling on the transportation road HL enters the intersection IS and turns right at the intersection IS, the direction indicators 37 are turned on. As illustrated in FIG. 8, since the blinker data is not assigned to the course points PI set before the operation range ARr, the direction indicators 37 are not turned on before the operation range ARr. When the dump truck 2 enters the operation range ARr and travels according to the course points PIr to which the blinker data is assigned, the blinker lamps 37R are turned on for right turning. In addition, when the dump truck 2 exits the operation range ARr and travels according to the course points PI to which the blinker data is not assigned, the blinker lamps 37R are turned off.

In a case where the traveling condition data to make the dump truck 2 go straight at the intersection IS is generated, the dump truck 2 travels in accordance with the course data CSs as illustrated in FIG. 8. The blinker data is not assigned to the course points PI of the course data CSs. Thus, the direction indicators 37 of the dump truck 2 traveling in accordance with the course data CSs do not operate.

As described above, according to the present embodiment, in a case where the dump truck 2 travels in the mine on the basis of the specified traveling condition data, since the direction indicators 37 are controlled on the basis of the operation range AR and the traveling condition data, a driver of a manned vehicle or an operator working in the mine around the dump truck 2 can know the traveling direction of the dump truck 2. This improves the safety in the mine.

In addition, in the present embodiment, since the blinker data is assigned to the course points PI set in the operation range AR from among the plurality of the course points PI in the traveling condition data, the direction indicators 37 of the dump truck 2 traveling in the operation range AR in accordance with the traveling condition data are properly turned on. In addition, since the direction indicators 37 are turned off after the operation range AR is passed through, the direction indicators 37 are prevented from being kept on.

Second Embodiment

A second embodiment will be described. Components that are the same or similar to those in the embodiment described above will be represented by the same reference numerals, and the description thereof will be simplified or will not be repeated.

Figure 9:
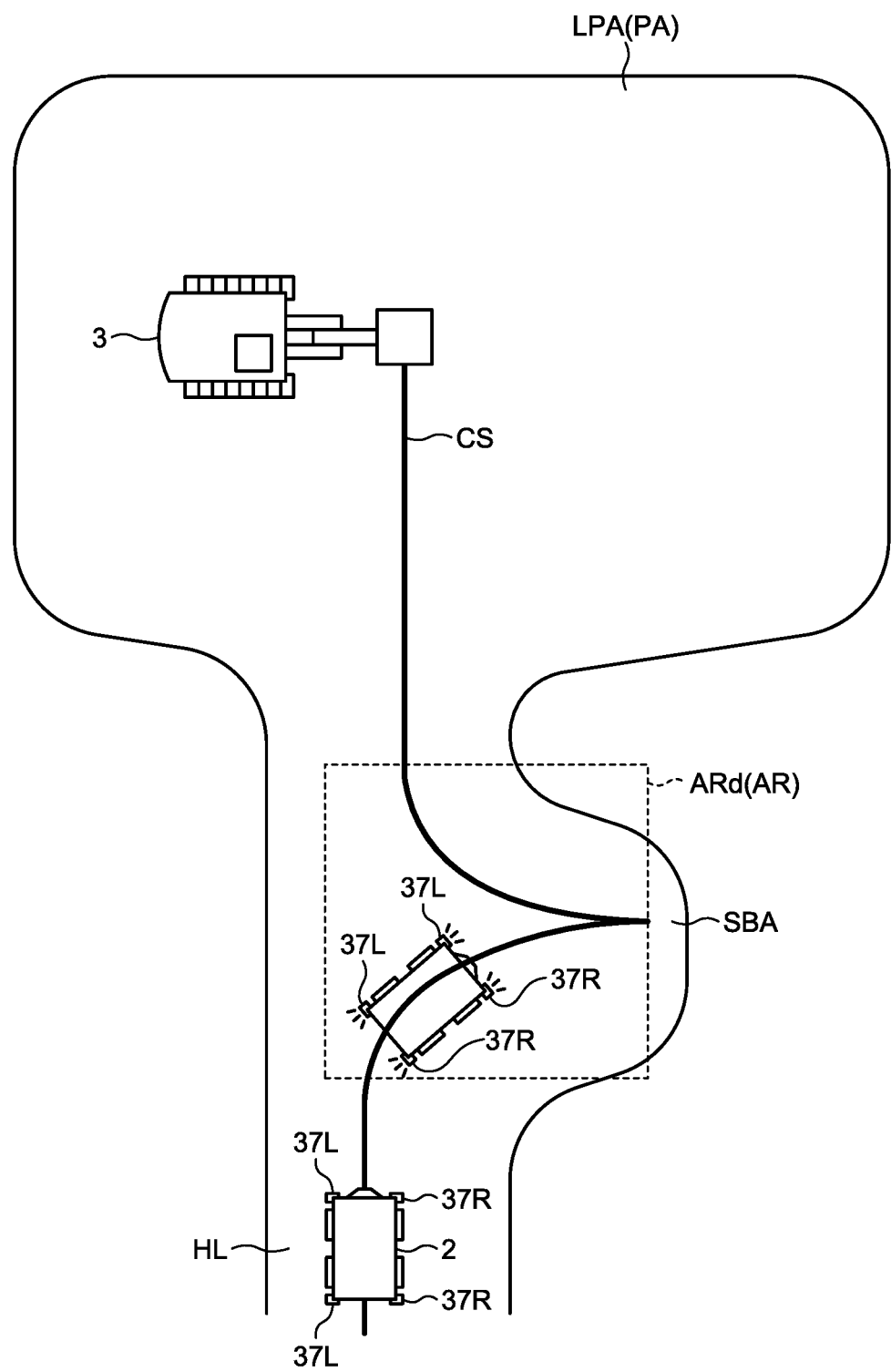
FIG. 9 is a diagram for explaining control on traveling and control on a direction indicator of a dump truck according to a second embodiment.
Figure 10:
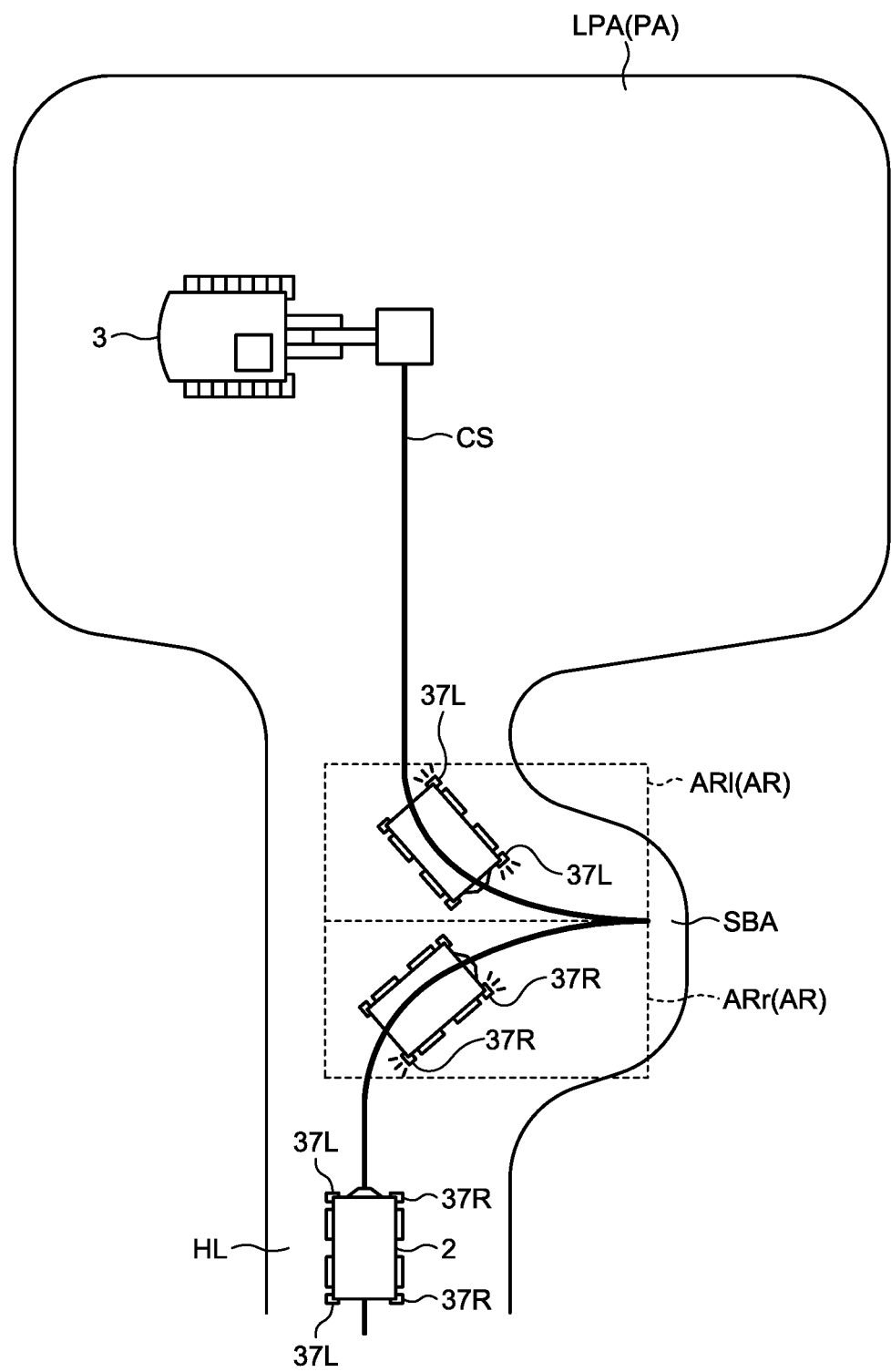
FIG. 10 is a diagram for explaining control on traveling and control on a direction indicator of a dump truck according to the second embodiment.

In the present embodiment, an example of a method for controlling the direction indicators 37 when the dump truck 2 enters a working site PA will be described. FIGS. 9 and 10 are diagrams schematically illustrating examples of operation of the direction indicators 37 when the dump truck 2 enters the working site PA. In FIGS. 9 and 10 according to the present embodiment, the working site PA is a loading site LPA in which a loader 3, which is another mining machine 3, is present; the working site PA may, however, be a soil discharging site DPA. In the following, examples of the loading site LPA illustrated in FIGS. 9 and 10 will be described.

The dump truck 2 entering the loading site LPA often approaches the loader 3 by switching back. The switching back refers to an operation of the dump truck 2, which has been moving forward, changing the traveling direction at an acute angle and approaching the loader 3 by traveling backward. In a case where the loading site LPA has such a small area that the dump truck 2 cannot switch back in the loading site LPA, a switch-back range SBA for switching back may be provided on a transportation road HL before the loading site LPA as illustrated in FIGS. 9 and 10. When the dump truck 2 switches back on the transportation road HL, the dump truck 2 appears as suddenly departing from a lane when viewed from another vehicle (manned vehicle).

Thus, as illustrated in FIGS. 9 and 10, the operation range setting unit 121 sets the operation range AR to the switch-back range SBA, which is an area specified in the mine. FIG. 9 illustrates an example in which a hazard operation range ARd is set, and the direction indicators 37 are controlled so that the blinker lamps 37R and the blinker lamps 37L are turned on at the same time when the dump truck 2 is present in the hazard operation range ARd. FIG. 10 illustrates an example in which a right-turn operation range ARr and a left-turn operation range AR1 are set, and the direction indicators 37 are controlled so that the blinker lamps 37R are turned on when the dump truck 2 is present in the right-turn operation range ARr during the first half of switch-back operation and that the blinker lamps 37L are turned on when the dump truck 2 is present in the left-turn operation range AR1 during the second half of the switch-back operation.

Third Embodiment

A third embodiment will be described. Components that are the same or similar to those in the embodiments described above will be represented by the same reference numerals, and the description thereof will be simplified or will not be repeated.

Figure 11:
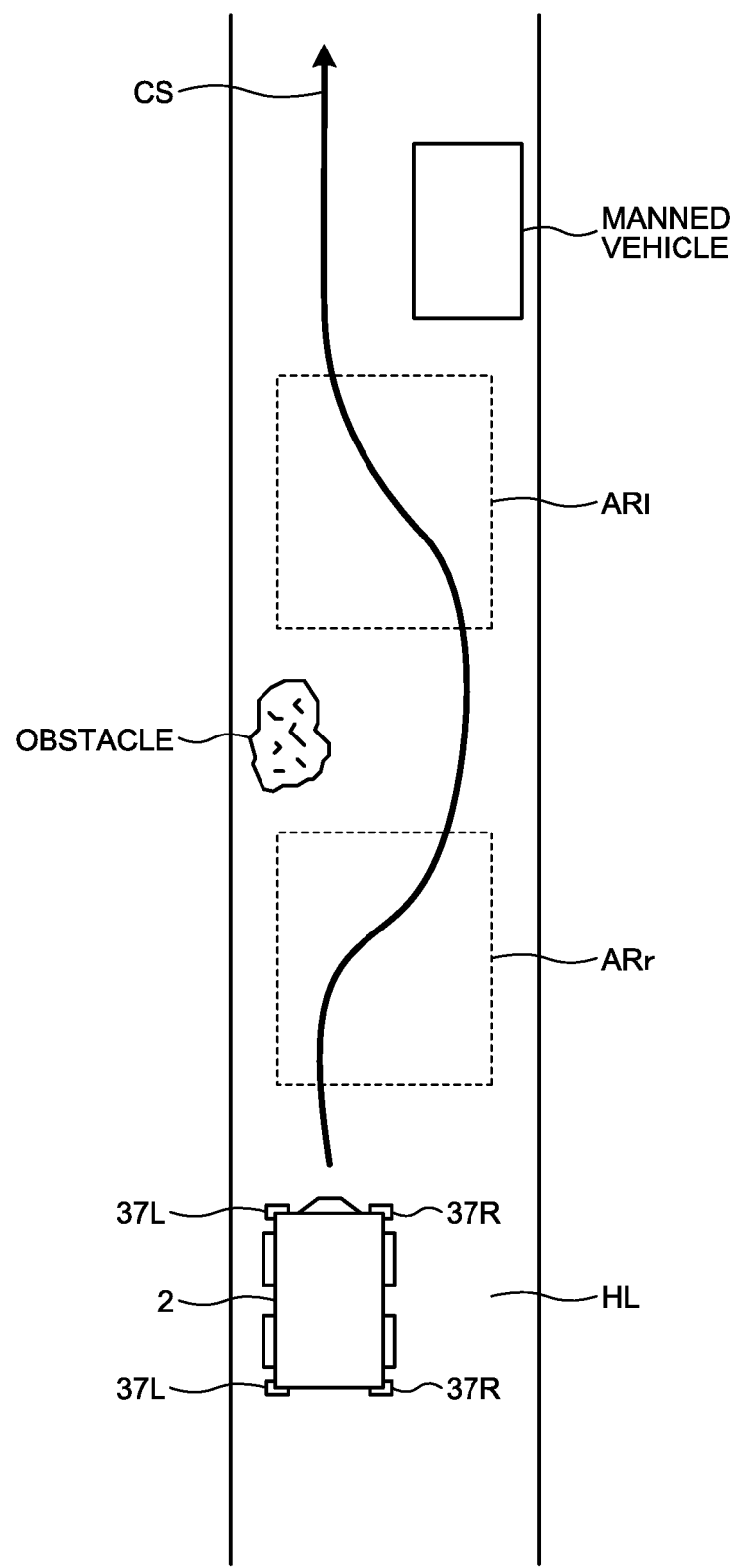
FIG. 11 is a diagram for explaining control on traveling and control on a direction indicator of a dump truck according to a third embodiment.

In the present embodiment, an example of a method for controlling the direction indicators 37 when the dump truck 2 travels on a transportation road HL on which an obstacle is present will be described. FIG. 11 is a diagram schematically illustrating an example of operation of the direction indicators 37 when the dump truck 2 travels on the transportation road HL on which an obstacle is present. Examples of the obstacle include a stopped vehicle, a fallen rock, and caving in a road.

When an obstacle is present on the transportation road HL and when the obstacle is to be avoided, the dump truck 2 needs to change the course. If, however, the dump truck 2 travels along a travel path as in FIG. 11, the dump truck 2 appears as suddenly departing from a lane when viewed from another vehicle (manned vehicle).

Thus, the operation range setting unit 121 sets the operation range AR to a range of a part of the transportation road HL on which the obstacle is present, which is an area specified in the mine. In the example illustrated in FIG. 11, a right-turn operation range ARr and a left-turn operation range AR1 are set on the transportation road HL. The direction indicators 37 are controlled so that the blinker lamps 37R are turned on when the dump truck 2 is present in the right-turn operation range ARr during the first half of course changing operation and that the blinker lamps 37L are turned on when the dump truck 2 is present in the left-turn operation range AR1 during the second half of the course changing operation.

Fourth Embodiment

A fourth embodiment will be described. Components that are the same or similar to those in the embodiments described above will be represented by the same reference numerals, and the description thereof will be simplified or will not be repeated.

Figure 12:
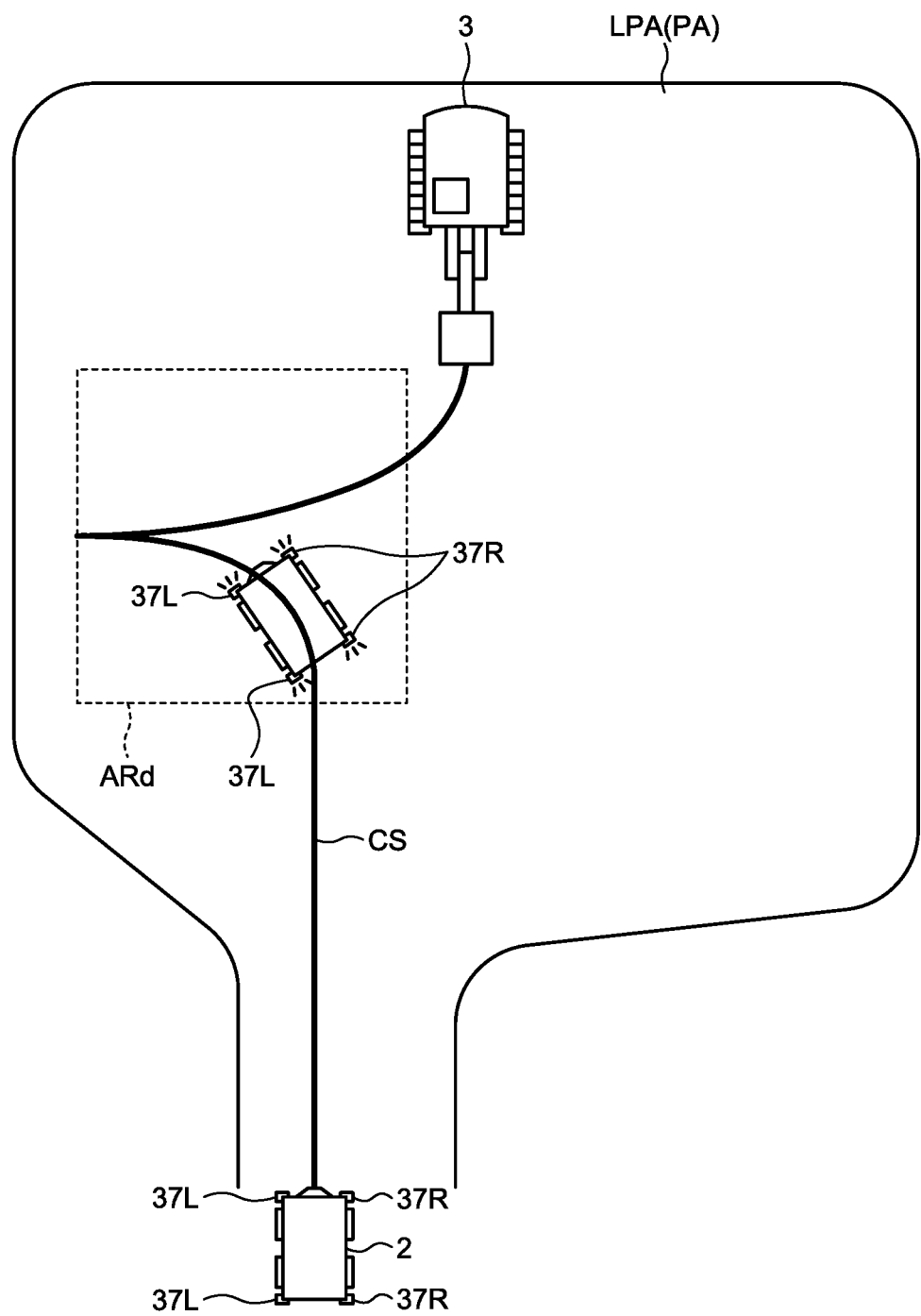
FIG. 12 is a diagram for explaining control on traveling and control on a direction indicator of a dump truck according to a fourth embodiment.
Figure 13:
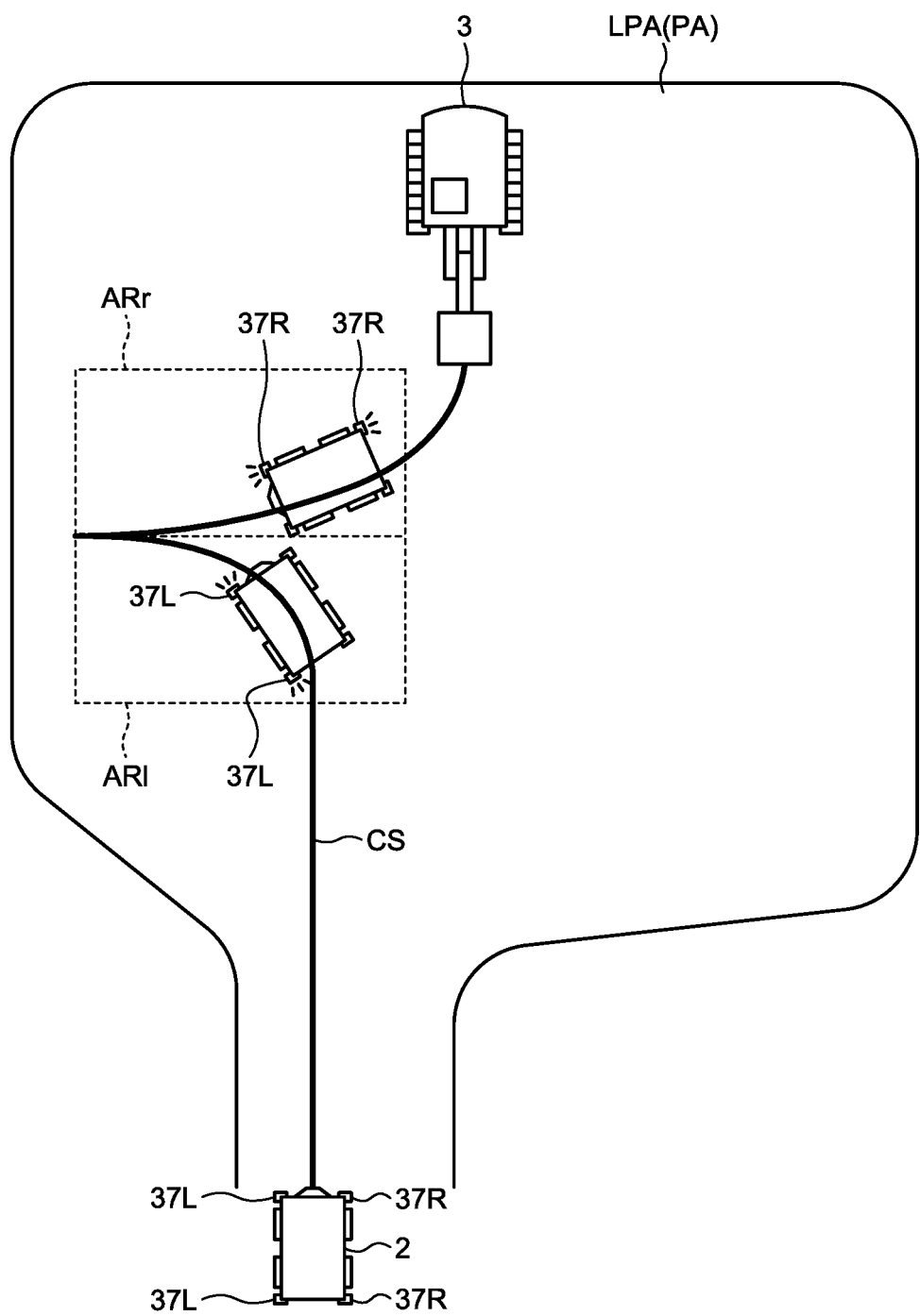
FIG. 13 is a diagram for explaining control on traveling and control on a direction indicator of a dump truck according to the fourth embodiment.

In the present embodiment, an example of a method for controlling the direction indicators 37 when the dump truck 2 enters a working site PA will be described. FIGS. 12 and 13 are diagrams schematically illustrating examples of operation of the direction indicators 37 when the dump truck 2 enters the working site PA. In FIGS. 12 and 13 according to the present embodiment, the working site PA is a loading site LPA in which a loader 3 is present; the working site PA may, however, be a soil discharging site DPA. In the following, examples of the loading site LPA illustrated in FIGS. 9 and 10 will be described.

As described above, the dump truck 2 entering the loading site LPA often approaches the loader 3 by switching back. The operation range setting unit 121 sets the operation range AR to the loading site LPA, which is an area specified in the mine. FIG. 12 illustrates an example in which a hazard operation range ARd is set, and the direction indicators 37 are controlled so that the blinker lamps 37R and the blinker lamps 37L are turned on at the same time when the dump truck 2 is present in the hazard operation range ARd. FIG. 13 illustrates an example in which a left-turn operation range AR1 and a right-turn operation range ARr are set, and the direction indicators 37 are controlled so that the blinker lamps 37L are turned on when the dump truck 2 is present in the left-turn operation range AR1 during the first half of switch-back operation and that the blinker lamps 37R are turned on when the dump truck 2 is present in the right-turn operation range ARr during the second half of the switch-back operation.

Fifth Embodiment

A fifth embodiment will be described. Components that are the same or similar to those in the embodiments described above will be represented by the same reference numerals, and the description thereof will be simplified or will not be repeated.

In the embodiments described above, the direction indicators 37 operate when the blinker data is assigned to the traveling condition data and when the dump truck 2 traveling in accordance with the traveling condition data is present in the operation range AR. In the present embodiment, an example in which the direction indicators 37 are controlled on the basis of the absolute position data of the dump truck 2 will be described.

Figure 14:
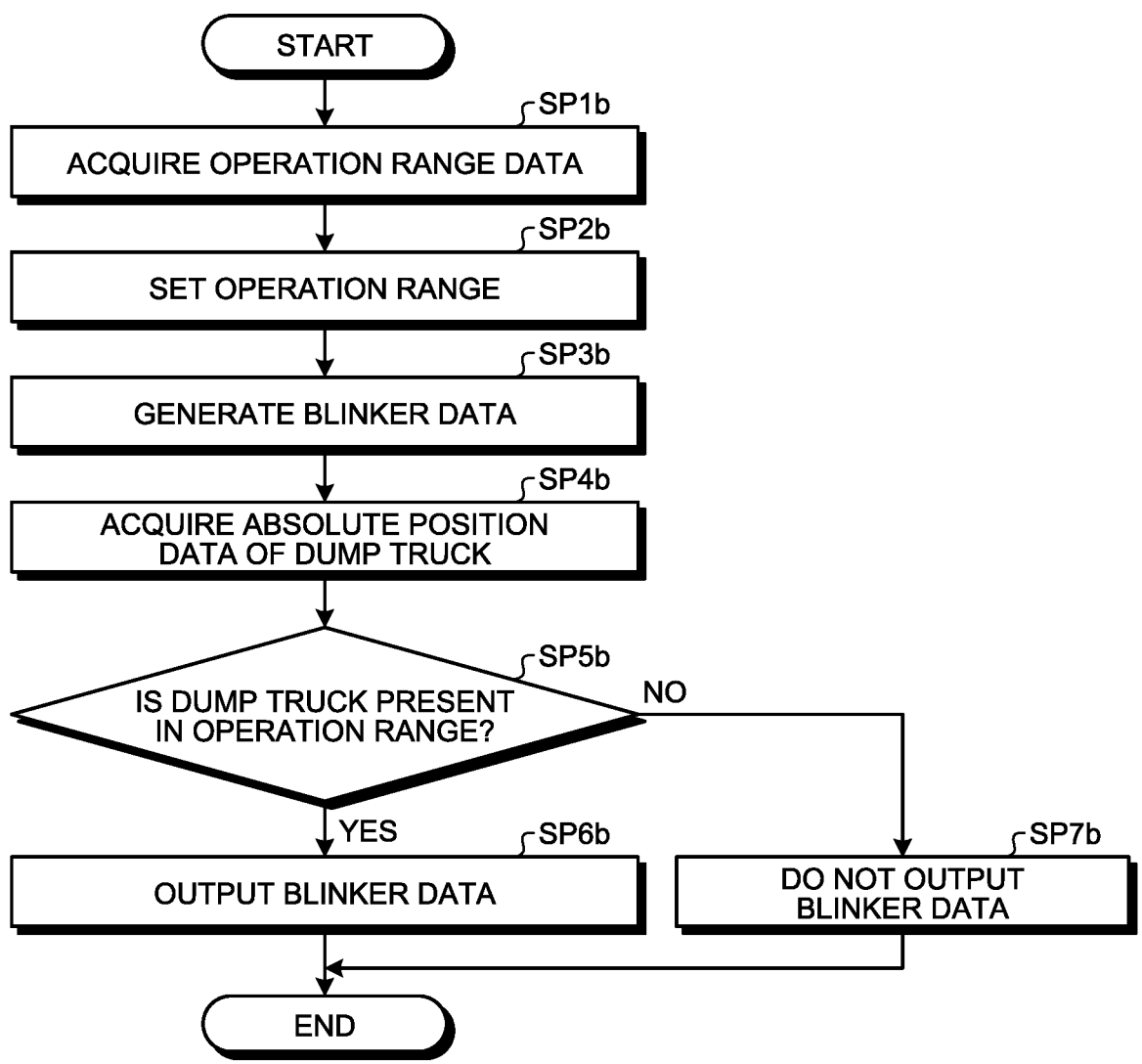
FIG. 14 is a flowchart illustrating an example of operation of a work machine management system according to a fifth embodiment.

FIG. 14 is a flowchart illustrating an example of operation of the management system 1 according to the present embodiment. In the control facility 7, the input device 17 is operated by an operator (manager), and the operation range data is generated. The operation range setting unit 121 acquires the operation range data generated by the input device 17 (step SP1b).

The operation range setting unit 121 sets the operation range AR on the basis of the operation range data generated by the input device 17 (step SP2b). The operation range setting unit 121 sets the operation range AR to an area specified in the mine on the map data.

The blinker data setting unit 123 generates blinker data for controlling the direction indicators 37 (step SP3b).

The absolute position data acquisition unit 124 acquires the absolute position data of the dump truck 2 (step SP4b).

The determination unit 125 determines whether or not the dump truck 2 is present in the operation range AR on the basis of the absolute position data of the dump truck 2 and the operation range AR set by the operation range setting unit 121 (step SP5b). Since the operation range AR is data defined in advance by absolute position coordinates, the determination unit 125 can determine whether or not the dump truck 2 is present in the operation range AR on the basis of the absolute position data of the dump truck 2.

If the dump truck 2 is determined to be present in the operation range AR in step SP5b (step SP5b: Yes), the management device 10 outputs the blinker data to the dump truck 2 determined to be in the operation range AR via the radio communication device 18 (step SP6b). This makes the direction indicators 37 of the dump truck 2 operate.

If the dump truck 2 is determined not to be present in the operation range AR in step SP5b (step SP5b: No), the blinker data is not output to the dump truck 2 (step SP7b).

As described above, the blinker data may be output in real time from the management device 10 to the dump truck 2 on the basis of the absolute position data of the dump truck 2.

Sixth Embodiment

A sixth embodiment will be described. Components that are the same or similar to those in the embodiments described above will be represented by the same reference numerals, and the description thereof will be simplified or will not be repeated.

In the embodiments described above, the operation range AR is set by the management device 10 of the management system 1, and the direction indicators 37 of the dump trucks 2 are controlled by the management device 10. In the present embodiment, an example in which the dump truck 2 autonomously controls the direction indicators 37 on the basis of the absolute position data of the dump truck 2 and the blinker data will be described.

As described with reference to FIG. 6, the dump truck 2 includes the blinker data acquisition unit 43 that acquires blinker data for controlling the direction indicators 37, the absolute position data acquisition unit 45 that acquires the absolute position data of the dump truck 2, and the blinker control unit 44 that outputs a blinker control signal to the direction indicators 43 on the basis of the blinker data acquired by the blinker data acquisition unit 43 and the absolute position data acquired by the absolute position data acquisition unit 45.

Figure 15:
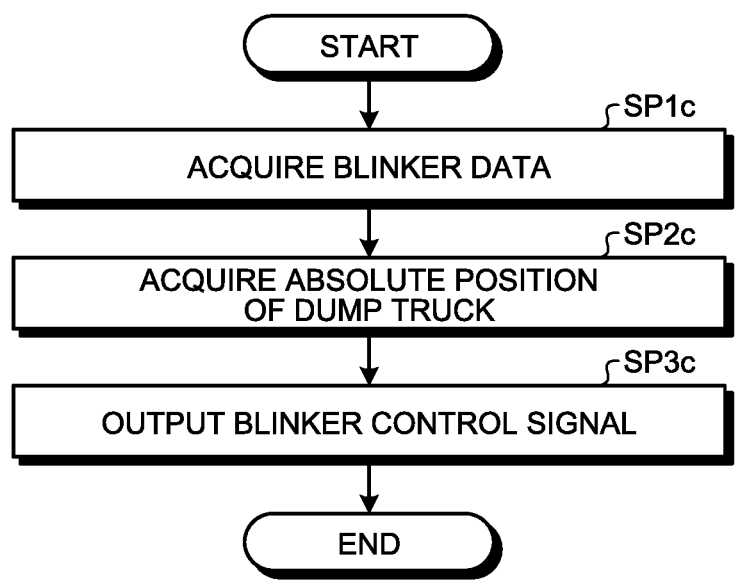
FIG. 15 is a flowchart illustrating an example of operation of a work machine control system according to a sixth embodiment.

FIG. 15 is a flowchart illustrating an example of operation of the control system 20 of the dump truck 2 according to the present embodiment.

The blinker data acquisition unit 43 acquires the blinker data for controlling the direction indicators 37 of the dump truck 2 (step SP1c). The blinker data acquisition unit 43 may acquire the blinker data supplied from the management device 10. In a case where the blinker data is stored in the storage unit 46 of the dump truck 2, the blinker data acquisition unit 43 may acquire the blinker data supplied from the storage unit 46. The blinker data include the operation range data described in the embodiments above. Note that the blinker data may include the map data of the mine.

The absolute position data acquisition unit 45 acquires the absolute position data of the dump truck 2 from the position detector 35 (step SP2c).

The blinker control unit 44 outputs the blinker control signal to the direction indicators 37 on the basis of the blinker data acquired in step SP1c and the absolute position data of the dump truck 2 acquired in step SP2c (step SP3c).

For example, the blinker control unit 44 determines whether or not the dump truck 2 is present in the operation range on the basis of the absolute position data of the dump truck 2 and the operation range data included in the blinker data, and outputs the blinker control signal for turning on the direction indicators 37 when the dump truck 2 is determined to be present in the operation range.

As described above, the dump truck 2 is capable of autonomously controlling the direction indicators 37 without data or instruction signals from the management device 10.

While examples in which a two-dimensional area is specified as the operation range AR are described in the embodiments above, the operation range AR is not limited to those in the embodiments, and may be specified by a position at which operation of blinkers is to be started and a position at which the operation of the blinkers is to be terminated on a travel path by using points, a line across the travel path, or the like, for example. Alternatively, a three-dimensional region may be specified.

In the embodiments described above, the dump truck 2 is an unmanned dump truck. The dump truck 2 may be a manned dump truck that travels according to a driver's operation. In a manned dump truck, a manipulation part such as a blinker lever for operating the direction indicators 37 is provided, and the manipulation part is manipulated by the driver. Even if the driver fails to manipulate the manipulation part when turning right or left at an intersection IS, the control system 20 intervenes in operation of the manipulation part to turn on the direction indicators 37. Thus, the control system 20 performs so-called assist control of assisting the operation performed by the driver. This ensures safety in a mine.

While examples of the mining machines used in a mine are described in the embodiments above, embodiments are not limited thereto and may be applied to work machines used in work sites. The work machines include mining machines. In addition, while examples in which the "work machine control system" is a control system of a dump truck in a mine on land are described in the embodiments above, the work machine control system is not limited thereto, and also includes control systems of other mining machines in a mine on land and work machines (such as wheel loaders) used in work sites.

REFERENCE SIGNS LIST

1 MANAGEMENT SYSTEM
2 DUMP TRUCK (MINING MACHINE)
3 OTHER MINING MACHINES
4 MINING MACHINE
5 POSITIONING SATELLITE
6 RELAY
7 CONTROL FACILITY
9 COMMUNICATION SYSTEM
10 MANAGEMENT DEVICE
11 COMPUTER
12 PROCESSOR
13 MEMORY
15 INPUT/OUTPUT UNIT

16 DISPLAY DEVICE
17 INPUT DEVICE
18 RADIO COMMUNICATION DEVICE
18A ANTENNA
20 CONTROL SYSTEM
21 TRAVELING DEVICE
22 VEHICLE BODY
23 VESSEL
24 DRIVE
25 CONTROLLER
26 WHEEL ASSEMBLY
27 AXLE
28 BRAKE SYSTEM
29 STEERING DEVICE
31 TRAVELING SPEED DETECTOR
32 ACCELERATION DETECTOR
36 RADIO COMMUNICATION DEVICE
37 DIRECTION INDICATOR
41 INPUT/OUTPUT UNIT
42 DRIVING CONTROL UNIT
43 BLINKER DATA ACQUISITION UNIT
44 BLINKER CONTROL UNIT
45 ABSOLUTE POSITION DATA ACQUISITION UNIT
46 STORAGE UNIT
121 OPERATION RANGE SETTING UNIT
122 TRAVELING CONDITION DATA GENERATION UNIT
123 BLINKER DATA SETTING UNIT
124 ABSOLUTE POSITION DATA ACQUISITION UNIT
125 DETERMINATION UNIT
126 MAP DATA ACQUISITION UNIT
AR OPERATION RANGE
CR CRUSHING MACHINE
DPA SOIL DISCHARGING SITE
HL TRANSPORTATION ROAD
IS INTERSECTION
LPA LOADING SITE
PA WORKING SITE
RP TARGET TRAVEL PATH
SBA SWITCH-BACK RANGE

The invention claimed is:

1. A work machine management system comprising:
an operation range setting unit that sets an operation range, which specifies a travel area on a map for a work machine where a direction indicator of the work machine is to be operated or not;
a traveling condition data generation unit that generates traveling condition data of the work machine;
a blinker data setting unit that generates blinker data for controlling the direction indicator on the basis of the operation range and the traveling condition data, the blinker data including an operation range which specifies the travel area on the map for the work machine where the direction indicator of the work machine is to be operated or not; and
an output device that outputs the blinker data to the work machine.

2. A work machine management system according to claim 1, wherein
the traveling condition data include a plurality of course points set at regular intervals,
each of the course points includes target absolute position data,
the blinker data setting unit sets the blinker data to the course points set within the operation range, and
the output device outputs the traveling condition data including the blinker data to the work machine.

3. A work machine management system according to claim 1, further comprising:
an absolute position data acquisition unit that acquire absolute position data of the work machine; and
a determination unit that determines whether or not the work machine is present in the operation range on the basis of the absolute position data, wherein
the blinker data is output to the work machine determined to be present in the operation range.

4. A work machine management system comprising:
an operation range setting unit that sets an operation range, which specifies a travel area on a map for a work machine where a direction indicator of the work machine is to be operated or not;
a blinker data setting unit that generates blinker data for controlling the direction indicator, the blinker data including an operation range which specifies the travel area on the map for the work machine where the direction indicator of the work machine is to be operated or not;
an absolute position data acquisition unit that acquires absolute position data of the work machine;
a determination unit that determines whether or not the work machine is present in the operation range on the basis of the absolute position data; and
an output device that outputs the blinker data to the work machine determined to be present in the operation range.

5. The work machine management system according to claim 1, further comprising:
a map data acquisition unit that acquires map data of a working site, wherein
the operation range setting unit sets the operation range to an area specified in the working site on the basis of the map data.

6. The work machine management system according to claim 1, further comprising:
an input device that generates operation range data indicating the operation range, wherein
the operation range setting unit sets the operation range on the basis of the operation range data generated by the input device.

7. A work machine control system comprising:
a blinker data acquisition unit that acquires blinker data for controlling a direction indicator of a work machine, the blinker data including an operation range which specifies a travel area on a map for the work machine where the direction indicator of the work machine is to be operated or not;
an absolute position data acquisition unit that acquires absolute position data of the work machine; and
a blinker control unit that outputs a blinker control signal to the direction indicator on the basis of the blinker data and the absolute position data.

8. A work machine comprising the work machine control system according to claim 7.

9. The work machine management system according to claim 4, further comprising:
a map data acquisition unit that acquires map data of a working site, wherein
the operation range setting unit sets the operation range to an area specified in the working site on the basis of the map data.

10. The work machine management system according to claim 4, further comprising:

an input device that generates operation range data indicating the operation range, wherein
the operation range setting unit sets the operation range on the basis of the operation range data generated by the input device.

\* \* \* \* \*